United States Patent [19]

Ishizuka et al.

[11] 4,278,448

[45] Jul. 14, 1981

[54] DIAMOND ABRASIVE GRITS

[76] Inventors: Hiroshi Ishizuka, 19-2 Ebara 6-chome, Shinagawa-ku, Tokyo; Kazuo Suzuki, 931 Kagawa, Chigasaki, Kanagawa, both of Japan

[21] Appl. No.: 44,067

[22] Filed: May 31, 1979

Related U.S. Application Data

[63] Continuation of Ser. No. 805,157, Jun. 9, 1977, abandoned.

[51] Int. Cl.$^3$ ............................................. C09K 3/14
[52] U.S. Cl. ................................. 51/295; 51/298; 51/309
[58] Field of Search ........................ 51/295, 298, 309

[56] References Cited

U.S. PATENT DOCUMENTS

| 3,904,391 | 9/1975 | Lindstrom et al. | 51/298 |
| 3,923,476 | 12/1975 | Roy | 51/298 |
| 3,957,461 | 5/1976 | Lindstrom et al. | 51/298 |
| 4,063,907 | 12/1977 | Lee | 51/295 |

Primary Examiner—James H. Derrington
Attorney, Agent, or Firm—Armstrong, Nikaido, Marmelstein & Kubovcik

[57] ABSTRACT

An abrasive tool for grinding a combined workpiece of a steel with an ultrahard alloy, comprising a grinding wheel comprising a resinoid binding wheel and synthetic diamond abrasive grits held therein, said grits being characterized by selected combinations of grit size, bulk density and grit strength.

13 Claims, No Drawings

DIAMOND ABRASIVE GRITS

This is a continuation of application Ser. No. 805,157, filed June 9, 1977 now abandoned.

The present invention relates to synthetic diamond abrasive grits for grinding a combined workpiece of a steel with an ultrahard alloy, and an abrasive tool containing such synthetic diamond abrasive grits.

In grinding steel materials, resinoid-bonded or metallic-bonded abrasive wheels or like tools have been conventionally employed in which some kind of resins or metals serve as a bonding material for diamond abrasive grits.

In manufacturing such tools, synthetic diamond abrasive grits are employed dominantly over natural ones, empirically and because of better economy. These grits are available from De Beers with the Trade Names of 37 DXDA" and "DXDA-MC".

When an abrasive wheel is manufactured in which such conventional diamond abrasive grits are contained, and is applied for a grinding of steel, especially for a grinding of a combined workpiece of a steel with an ultrahard alloy, there may be raised such disadvantages that the wheel may wear at too high a rate uneconomically, the wheel may be frequently loaded, thus requiring dressing to break a smooth grinding operation, or burn marks are formed on a workpiece.

We, the Co-Inventors of the present invention, have found these disadvantages would be attributed to that synthetic diamond abrasive grits contained in the abrasive tools have an unsuitable combination of the physical properties, such as the bulk density and grit strength with the grit size degree.

As a result of our many years' researches for the improvement in the physical properties of synthetic diamond abrasive grits, in which their bulk density and grit strength were changed, the present invention has been completed.

The present invention is to provide an efficient grinding of a steel, especially of a combined workpiece of a steel with an ultrahard alloy, in which the improved diamond abrasive grits are contained.

The present invention is directed to synthetic diamond abrasive grits for grinding a combined workpiece of a steel with an ultrahard alloy, and an abrasive tool containing such synthetic diamond abrasive grits, said grits being characterized by one selected from combinations of the grits size, bulk density and grit strength as listed in the following Table 1:

TABLE 1

| Combination | Grit Size mesh/in | Bulk Density g/cc | Grit Strength % by wt./sec |
|---|---|---|---|
| 1 | 60 to 80 | 1.80 to 1.88 | 38 to 50/45 |
| 2 | 80 to 100 | 1.80 to 1.88 | 38 to 50/60 |
| 3 | 100 to 120 | 1.80 to 1.88 | 38 to 50/75 |
| 4 | 120 to 140 | 1.78 to 1.88 | 38 to 50/90 |
| 5 | 140 to 170 | 1.78 to 1.88 | 38 to 50/120 |
| 6 | 170 to 200 | 1.78 to 1.85 | 38 to 50/150 |
| 7 | 200 to 230 | 1.78 to 1.85 | 38 to 50/180 |
| 8 | 230 to 270 | 1.75 to 1.83 | 38 to 50/210 |
| 9 | 270 to 325 | 1.75 to 1.83 | 38 to 50/230 |
| 10 | 325 to 400 | 1.72 to 1.80 | 38 to 50/270 |

In the practice of the present invention, the properties of synthetic diamond abrasive grits can be changed chemically, thermally or mechanically. For example, the grit bulk density can be modified by a chemical etching of the grits with potassium nitrate, and the grit strength, by ball-milling or by quick heating followed by quick cooling. These techniques are referred to in Japanese Patent Publications 11,875/75; 26,603/70 and 29,716/73, respectively. By a combination of such techniques, there can be prepared synthetic diamond abrasive grits which have combined physical properties, namely the grit size, bulk density and grit strength as shown in the above Table 1.

By employment of the synthetic diamond abrasive grits characterized by the properties as listed in the Table 1, an excellent grinding efficiency can be achieved in grinding a combined workpiece of a steel with an ultrahard alloy, as well as a workpiece consisting of a steel alone.

As a result of comparative tests for grinding ratio, which is expressed by a ratio of the volume removed of a workpiece to that of an abrasive wheel worn away by the work, we found the grinding ratio has been improved by about 40% when a resinoid-bonded abrasive wheel contains grits as characterized in the Table 1, in comparison with when it contains the conventional ones, in a grinding of a combined workpiece of a steel with an ultrahard alloy.

A workpiece can be consist of various steels and ultrahard alloys: the former being such steel as so-called die steel among alloy steels, carbon steel, carbon tool steel, and alloy structural steel; the latter being exemplified by a sintered WC-Co alloy.

The synthetic diamond abrasive grits of the present invention can be coated with nickel, copper, cobalt or any like metals conventionally used for such grits. Such metallic coating can consist of a single or multiple layers, each of which is formed of a same or different metal deposition.

The metallic coating on the grits can be formed by any conventional methods, such as an electroplating, a chemical plating or a vacuum deposition.

In a preferred embodiment of the invention, the synthetic diamond abrasive grits have thereon a chemically formed three-layered metallic coating, such that a first, or innermost, layer of a nickel deposition may have a dense and even surface; a second, or middle, layer of a nickel deposition may have a ragged or uneven surface; and a third, or outer, layer of a nickel or copper deposition may have a dense and even surface.

The present invention is illustrated by the following Examples.

EXAMPLE 1

Synthetic diamond grits having a size of 120 to 140 mesh according to ASTM E-11-61 were chemically etched by a fused potassium nitrate, were ball-milled into grits with a desired grit strength, and then were classified depending upon a bulk density by using a vibrating plate. The physical properties of the respective classified diamond abrasive grits are shown in the following Table 2.

TABLE 2

| | Grit size: 120–140 mesh (ASTM E-11-61) | | |
|---|---|---|---|
| Test No. | Bulk density g/cc% by wt./sec | Grit strength | Note |
| 1 | less than 1.78 | less than 38%/90 | Control |
| 2 | " | 38 to 50%/90 | Control |
| 3 | " | more than 58%/90 | Control |
| 4 | ⎫ | less than 38%/90 | Control |
| 5 | ⎬ 1.78 to 1.88 | 38 to 50%/90 | Product of present invention |

TABLE 2-continued

| | Grit size: 120-140 mesh (ASTM E-11-61) | |
|---|---|---|
| Test No. | Bulk density g/cc% by wt./sec | Grit strength Note |
| 6 | | more than 58%/90 Control |
| 7 | } more than 1.88 | less than 38%/90 Control |
| 8 | | 38 to 50%/90 Control |

Grit strength herein is expressed by a fraction, the numerator of which is a percentage in weight of grits to be fractured, and the denominator is a period for which the tester ran. The denominator being equal in Table 1, larger numerator indicates the grits are more friable.

Resinoid-bonded abrasive wheels are prepared by a conventional method, which contained the eight sorts of the above shown diamond grits and the conventional ones, respectively. Data of preparing the wheels are given below;

| Wheel | |
|---|---|
| Shape, type and dimensions: | Straight, Type 1A1 175 mm (diameter) × 5.5 mm (width) × 2.5 mm (depth of impregnation) |
| Bonding materials: | Mixture of 70% PM 40 and 30% PR 8000, both being Trade name given to synthetic phenolic resins manufactured by Sumitomo Bakelite Co., Ltd. |
| Diamond concentration: | 100 |
| Sintering temperature, time and pressure: | 195° C., 15 min., 250 kg/cm² |
| Curing: | 175° C. for 5 hours |

A series of comparative tests were carried out in use of the wheels on grinding of a steel and simultaneous grinding of a steel with an ultrahard alloy. Grinding data were as follows:

| Grinding condition | |
|---|---|
| Wheel peripheral speed: | 1,530 m/min. |
| Table speed: | 15 m/min. |
| Crossfeed: | 1.0 mm/pass |
| Infeed: | 0.025 mm |
| Form: | Wet grinding of plane surface |
| Workpiece material: | SKD-11 die steel (JIS G-4404-1972) |

Result

Results of the test are given in Table 3. Table 3 clearly shows that the wheel containing the abrasive grits of No. 5 has achieved quite an improved grinding ratio as compared with both the grits of the other numbers and the conventional ones.

TABLE 3

| Diamond abrasive grit | | Grinding ratio index |
|---|---|---|
| Test No. 1 | Control | 125 |
| Test No. 2 | " | 111 |
| Test No. 3 | " | 92 |
| Test No. 4 | " | 148 |
| Test No. 5 | Product of present invention | 200 |
| Test No. 6 | Control | 114 |
| Test No. 7 | " | 101 |
| Test No. 8 | " | 106 |
| Commercial product | | 100 |

Resinoid-bonded abrasive wheels were also prepared for comparative tests on grinding of a combined workpiece of a steel with an ultrahard alloy. Preparing date were as follows:

| Wheel | |
|---|---|
| Shape, type and dimensions: | Straight, Type 1A1 175 mm (diameter) × 6.0 mm (width) × 2.5 mm (depth of impregnation) |
| Bonding materials: | Mixture of 70% PM 40 and 30% PR 8000, both being Trade name given to synthetic phenolic resins manufactured by Sumitomo Bakelite Co., Ltd. |
| Diamond concentration: | 100 |
| Sintering temperature, time and pressure: | 195° C., 15 min., 250 kg/cm² |
| Curing: | 175° C. for 5 hours |
| Grinding condition | |
| Wheel peripheral speed: | 1,650 m/min. |
| Table speed: | 12 m/min. |
| Crossfeed: | 2 mm/pass |
| Infeed: | 0.02 mm |
| Form: | Wet grinding of plane surface |
| Workpiece material: | SK-3 tool steel (JIS G 4401-1972) G-1 sintered tungsten carbide-cobalt alloy (JIS H 5501-1953) |

In this case, the grinding ratio with each wheel is shown in Table 4.

TABLE 4

| Diamond abrasive grit | | Grinding ratio index |
|---|---|---|
| Test No. | 1 | Control | 116 |
| " | 2 | " | 113 |
| " | 3 | " | 110 |
| " | 4 | " | 112 |
| " | 5 | Product of present invention | 138 |
| " | 6 | Control | 104 |
| " | 7 | " | 78 |
| " | 8 | " | 80 |
| Commercial product | | | 100 |

EXAMPLE 2

The synthetic diamond abrasive grits exhibited further improved grinding ratios in grinding of both steel and a combined workpiece of a steel with an ultrahard alloy, when they had thereon an adequately formed metallic coating.

Synthetic diamond abrasive grits prepared in the manner described in Example 1 was chemically nickel plated in a chemical nickel plating bath which consisted of nickel chlorides as main constituent with sodium hypophosphate as a reducing agent. Thus synthetic diamond abrasive grits had on the surface a rather dense coating of a nickel deposition which has an even surface and weighed 1.22 times the substrate grits.

These nickel coated synthetic diamond abrasive grits were divided into two parts, I and II. The part I grits were not subjected to any further coating process. The part II grits were for a further two times placed in a chemical plating bath of the same constituents as the previous coating process, but under changed reducing agent concentration at a changed bath temperature. Thus synthetic diamond abrasive grits were obtained which had on the surface a three-layered nickel coating such that the first layer was dense and had an even surface, the second one had a ragged uneven surface, and then the third one was again dense and had an even surface.

Then, by a conventional method, resinoid-bonded abrasive wheels were made which contained the part I and II grits, and metallic coated conventional diamond abrasive grits for steel grinding, respectively.

A series of comparative tests were carried out on grinding of a steel and grinding of a combined workpiece of a steel with an ultrahard alloy.

| Wheel | |
|---|---|
| Shape, type and dimensions: | Straight, Type 1A1 175 mm (diameter) × 5.4 mm (width) × 2.5 mm (depth of impregnation) |
| Bonding material: | Mixture of 70% PM 40 and 30% PR 8000, both being Trade name given to synthetic phenolic resins manufactured by Sumitomo Bakelite Co., Ltd. |
| Diamond concentration: | 100 |
| Grit size: | 120/140 mesh/in., according to ASTM E-11-61 |
| Sintering temperature, time and pressure: | 195° C., 15 min., 250 kg/cm² |
| Curing condition: | 175° C. for 5 hours |
| Workpiece material: | SK-3 tool steel (JIS G 4401-1972) |
| Grinding condition | |
| Wheel peripheral speed: | 1,500 m/min. |
| Table speed: | 15 m/min. |
| Crossfeed: | 1.0 mm/pass |
| Infeed: | 0.025 mm |
| Form: | Wet grinding of plane surface |

Result

The result of grinding ratio obtained is shown in Table 5.

TABLE 5

| | | Grinding ratio index | |
|---|---|---|---|
| Diamond abrasive grits | | Part I Abrasive grits | Part II Abrasive grits |
| Test No. | 1 Control | 92 | 115 |
| " | 2 " | 99 | 124 |
| " | 3 " | 76 | 95 |
| " | 4 " | 116 | 145 |
| " | 5 Product of present invention | 146 | 198 |
| " | 6 Control | 100 | 133 |
| " | 7 " | 85 | 105 |
| " | 8 " | 80 | 100 |
| Commercial product | | 100 | |

Technical data for the tests on grinding of a combined workpiece of a steel with an ultrahard alloy are given below:

| Workpiece: | Patchworks of steel and ultrahard alloy, with area ratio of 5 to 1. |
|---|---|
| Workpiece material: | S55C tool steel (JIS G 4051-1965) G-2 sintered WC-Co alloy (JIS H 5501-1953) |
| Wheel peripheral speed: | 1,800 m/min. |
| Crossfeed: | 2 mm/pass |
| Infeed: | 0.020 mm |
| Form: | Wet grinding of plane surface |

Grinding ratios in this case are shown in Table 6.

TABLE 6

| | | Grinding ratio index | |
|---|---|---|---|
| Diamond abrasive grits | | Part I Abrasive grits | Part II Abrasive grits |
| Test No. | 1 Control | 120 | 124 |
| " | 2 " | 124 | 134 |
| " | 3 " | 115 | 115 |
| " | 4 " | 110 | 120 |
| " | 5 Product of present invention | 130 | 163 |
| " | 6 Control | 115 | 143 |
| " | 7 " | 76 | 102 |
| " | 8 " | 88 | 112 |
| Commercial product | | 100 | |

From the results of Examples 1 and 2, it is apparent that the diamond abrasive grits according to the present invention as embodied above, permit quite an improved grinding performance as compared with the conventional ones.

Here it will be noted that the bulk density values in the specification have been obtained according to ANSI-B74-17-1971 from American National Standard Test for Bulk Density of Diamond Abrasive Grains, and the grit strength values, by the method described in L. M. Zsolnay: "Physical Evaluation of Diamond Abrasive Grain" DWMI Technical Symposium, Chicago, September 1971, pp 8-1 to 8-4.

What is claimed is:

1. An abrasive tool for grinding a combined workpiece of a steel with an ultrahard alloy, comprising a grinding wheel comprising a resinoid binding material and synthetic diamond abrasive grits held therein, said abrasive grits being selected from one of the combinations of the grit size, bulk density and grit strength as listed in the following:

| Combination | Grit Size mesh/in | Bulk Density g/cc | Grit Strength % by wt./sec |
|---|---|---|---|
| 1 | 60 to 80 | 1.80 to 1.88 | 38 to 50/45 |
| 2 | 80 to 100 | 1.80 to 1.88 | 38 to 50/60 |
| 3 | 100 to 120 | 1.80 to 1.88 | 38 to 50/75 |
| 4 | 120 to 140 | 1.78 to 1.88 | 38 to 50/90 |
| 5 | 140 to 170 | 1.78 to 1.88 | 38 to 50/120 |
| 6 | 170 to 200 | 1.78 to 1.85 | 38 to 50/150 |
| 7 | 200 to 230 | 1.78 to 1.85 | 38 to 50/180 |
| 8 | 230 to 270 | 1.75 to 1.83 | 38 to 50/210 |
| 9 | 270 to 325 | 1.75 to 1.83 | 38 to 50/230 |
| 10 | 325 to 400 | 1.72 to 1.80 | 38 to 50/270 |

2. An abrasive tool for grinding a combined workpiece of a steel with an ultrahard alloy as claimed in claim 1, wherein the synthetic diamond abrasive grits have a metallic coating formed thereon.

3. An abrasive tool for grinding a combined workpiece of a steel with an ultrahard alloy as claimed in claim 2, wherein the metallic coating consists of a single layer.

4. An abrasive tool for grinding a combined workpiece of a steel with an ultrahard alloy as claimed in claim 3, wherein the layer consists of a nickel deposition.

5. An abrasive tool for grinding a combined workpiece of a steel with an ultrahard alloy as claimed in claim 3, wherein the layer consists of a cobalt deposition.

6. An abrasive tool for grinding a combined workpiece of a steel with an ultrahard alloy as claimed in claim 3, wherein the metallic coating consists of three sequent layers: the innermost and the outer ones having a dense and even surface, and the middle one having a ragged and uneven surface.

7. An abrasive tool for grinding a combined workpiece of a steel with an ultrahard alloy as claimed in claim 6, wherein each of the three layers consists of a nickel deposition.

8. An abrasive tool for grinding a combined workpiece of a steel with an ultrahard alloy as claimed in claim 6, wherein the innermost and the middle layers consists of a nickel deposition, and the outer one, of a copper deposition.

9. An abrasive tool for grinding a combined workpiece of a steel with an ultrahard alloy as claimed in claim 6, wherein the innermost and the middle layers consist of a nickel deposition, and the outer one, of a cobalt deposition.

10. An abrasive tool for grinding a combined workpiece of a steel with an ultrahard alloy as claimed in claim 2, wherein the metallic coating is formed by an electroplating.

11. An abrasive tool for grinding a combined workpiece of steel with an ultrahard alloy as claimed in claim 2, wherein the metallic coating is formed by a chemical plating.

12. An abrasive tool for grinding a combined workpiece of a steel with an ultrahard alloy as claimed in claim 2, wherein the metallic coating is formed by a vacuum deposition.

13. An abrasive tool for grinding a combined workpiece of a steel with an ultrahard alloy as claimed in any one of claims 1–12, wherein the resinoid bonding material is a phenolic resin.

* * * * *